(12) United States Patent
Larzul

(10) Patent No.: US 11,645,510 B2
(45) Date of Patent: May 9, 2023

(54) ACCELERATING NEURON COMPUTATIONS IN ARTIFICIAL NEURAL NETWORKS BY SELECTING INPUT DATA

(71) Applicant: Mipsology SAS, Palaiseau (FR)

(72) Inventor: Ludovic Larzul, El Dorado Hills, CA (US)

(73) Assignee: MIPSOLOGY SAS, Palaiseau (FR)

( * ) Notice: Subject to any disclaimer, the term of this patent is extended or adjusted under 35 U.S.C. 154(b) by 1032 days.

(21) Appl. No.: 16/377,532

(22) Filed: Apr. 8, 2019

(65) Prior Publication Data

US 2020/0320384 A1 Oct. 8, 2020

(51) Int. Cl.
*G06N 3/08* (2023.01)
*G06N 3/04* (2023.01)

(52) U.S. Cl.
CPC ............... *G06N 3/08* (2013.01); *G06N 3/04* (2013.01)

(58) Field of Classification Search
CPC ........... G06N 3/08; G06N 3/04; G06F 7/5443
See application file for complete search history.

(56) References Cited

U.S. PATENT DOCUMENTS

| | | |
|---|---|---|
| 2016/0358069 A1 | 12/2016 | Brothers et al. |
| 2017/0344876 A1 | 11/2017 | Brothers |
| 2018/0018553 A1* | 1/2018 | Bach ...................... G06N 3/084 |
| 2019/0042922 A1* | 2/2019 | Pillai ..................... G06N 3/0481 |
| 2019/0080226 A1 | 3/2019 | Lee et al. |
| 2019/0147327 A1* | 5/2019 | Martin ..................... G06F 17/15 706/15 |
| 2019/0340489 A1* | 11/2019 | Mills ......................... G06N 3/08 |

OTHER PUBLICATIONS

He, Y., Kang, G., Dong, X., Fu, Y., & Yang, Y. (2018). Soft filter pruning for accelerating deep convolutional neural networks. arXiv preprint arXiv:1808.06866. (Year: 2018).*

Hegde Kartik et al: "UCNN: Exploiting Computational Reuse in Deep Neural Networks via Weight Repetition", 2018 ACM/IEEE 45th Annual International Symposium on Computer Architecture (ISCA), IEEE, Jun. 1, 2018 (Jun. 1, 2018), pp. 674-687, XP033375528, DOI: 10.1109/ISCA. 2018.00062 [retrieved on Jul. 19, 2018], abstract, p. 677, left-hand column, line 1—p. 680, right-hand column, line 32—figures 4-7.

(Continued)

*Primary Examiner* — Ying Yu Chen
*Assistant Examiner* — Lokesha G Patel
(74) *Attorney, Agent, or Firm* — Georgiy L. Khayet

(57) ABSTRACT

An example method for accelerating neuron computations in an artificial neural network (ANN) comprises receiving a plurality of pairs of first values and second values associated with a neuron of an ANN, selecting pairs from the plurality of pairs, wherein a count of the selected pairs is less than a count of all pairs in the plurality of pairs, performing mathematical operations on the selected pairs to obtain a result, determining that the result does not satisfy a criterion, and, until the result satisfies the criterion, selecting further pairs from the plurality, performing the mathematical operations on the selected further pairs to obtain further results, and determining, based on the result and the further results, an output of the neuron.

18 Claims, 8 Drawing Sheets

(56) References Cited

OTHER PUBLICATIONS

Huk Maciej Ed—Ando N et al: "Weights Ordering During Training of Contextual Neural Networks with Generalized Error Backpropagation: Importance and Selection of Sorting Algorithms", Feb. 14, 2018 (Feb. 14, 2018), International Conference on Financial Cryptography and Data Security; [Lecture Notes in Computer Science; Lect.Notes Computer], Springer, Berlin, Heidelberg, pp. 200-211, XP047465120, ISBN: 978-3-642-17318-9, [retrieved on Feb. 14, 2018], abstract, p. 203, line 37—p. 205, line 26.

Kim Dongyoung et al: "A novel zero weight/activation-aware hardware architecture of convolutional neural network", Design, Automation & Test in Europeconference & Exhibition (Date), 2017, EDAA, Mar. 27, 2017 (Mar. 27, 2017), pp. 1462-1467, XP033096588, DOI: 10.23919/DATE.2017.7927222 [retrieved on May 11, 2017], abstract, p. 1463, right-hand column, line 20—p. 1465, right-hand column, line 28, figure 2.

\* cited by examiner

ACCELERATING NEURON COMPUTATIONS IN ARTIFICIAL NEURAL NETWORKS BY SELECTING INPUT DATA

TECHNICAL FIELD

The present disclosure relates generally to data processing and, more particularly, to a system and method for accelerating neuron computations in artificial neural networks (ANNs) by selecting input data.

BACKGROUND

Artificial Neural Networks (ANNs) are simplified and reduced models reproducing behaviors of the human brain. The human brain contains 10-20 billion neurons connected through synapses. Electrical and chemical messages are passed from neurons to neurons based on input information and their resistance to passing information. In the ANNs, a neuron can be represented by a node performing a simple operation of addition coupled with a saturation function. A synapse can be represented by a connection between two nodes. Each of the connections can be associated with an operation of multiplication by a constant. The ANNs are particularly useful for solving problems that cannot be easily solved by classical computer programs.

While forms of the ANNs may vary, they all have the same basic elements similar to the human brain. A typical ANN can be organized into layers and each of the layers may include many neurons sharing similar functionality. The inputs of a layer may come from a previous layer, multiple previous layers, any other layers, or even the layer itself. Major architectures of ANNs include Convolutional Neural Network (CNN), Recurrent Neural Network (RNN), and Long Term Short Memory (LTSM) network, but other architectures of ANN can be developed for specific applications. While some operations have a natural sequence (for example, a layer depending on previous layers), most operations can be carried out in parallel within the same layer. The ANNs can then be computed in parallel on many different computing elements similar to neurons of the brain. A single ANN may have hundreds of layers. Each of the layers can involve millions of connections. Thus, a single ANN may potentially require billions of simple operations like multiplications and additions.

Because of the larger number of operations and their parallel nature, ANNs can result in a very heavy load for processing units (e.g., CPU), even ones running at high rates. Sometimes, to overcome limitations of CPUs, graphics processing units (GPUs) can be used to process large ANNs because GPUs have a much higher throughput capacity of operations in comparison to CPUs. Because this approach at least partially solves the throughput limitation problem, GPUs appear to be more efficient in the computations of ANNs than the CPUs. However, GPUs are not well suited to the computations of ANNs because the GPUs have been specifically designed to compute graphical images.

The GPUs may provide a certain level of parallelism in computations. However, the GPUs are constraining the computations in long pipes implying latency and lack of reactivity. To deliver the maximum throughput, very large GPUs can be used, which may involve excessive power consumption, which is a typical issue of GPUs. The deployment of GPUs can be difficult since the GPUs may require more power consumption for the computations of ANNs.

To summarize, CPUs provide a very generic engine that can execute very few sequences of instructions with a minimum effort in terms of programming, but lack the power of computing for ANN. GPUs are slightly more parallel and require a larger effort of programming than CPUs, which can be hidden behind libraries with some performance costs, but are not very well suitable for ANNs.

Field Programmable Gate Arrays (FPGAs) are professional components that can be programmed at the hardware level after they are manufactured. The FPGAs can be configured to perform computations in parallel. Therefore, FPGAs can be well suited to compute ANNs. One of the challenges of FPGAs is the programming, which requires a much larger effort than programming CPUs and GPUs. Adaption of FPGAs to perform ANN computations can be more challenging than for CPUs and GPUs.

Most attempts in programming FPGAs to compute ANNs have being focusing on a specific ANN or a subset of ANNs, requiring modification of the ANN structure to fit into a specific limited accelerator, or providing a basic functionality without solving the problem of computing ANNs on FPGAs globally. The computation scale is typically not taken into account for existing FPGA solutions, with much of the research being limited to a single or few computation engines, which could be replicated. The existing FPGA solutions do not solve the problem of massive data movement required at a large scale for the actual ANN involved in real industrial applications. The inputs to be computed with an ANN are typically provided by an artificial intelligence (AI) framework. Those programs are used by the AI community to develop new ANN or global solutions based on ANN. Furthermore, the FPGAs lack integration in those software environments.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to one example embodiments, a system for accelerating neuron computations in an artificial neural network (ANN) is provided. The system may include one or more processing units configured to receive a plurality of pairs. The pairs may include first values and second values. Each of the first values and each of second values can be represented by one or more numbers. A combination of the one or more numbers describes the value of the first value or the second value. The plurality of pairs can be used for calculation of a neuron of an ANN. The processing units may select one or more pairs from the plurality of pairs. A count of the selected pairs can be less than a count of all pairs in the plurality of pairs. The processing units may perform mathematical operations on the selected pairs to obtain a result. The processing units may determine that the result does not satisfy a criterion. Upon determination that the result does not satisfy the criterion, the processing units can perform further operations including selecting one or more further pairs from the plurality of pairs and performing the mathematical operations on the selected further pairs to obtain a further result. The processing unit may further determine, based on the result and the further result, an output of the neuron.

The processing units can be configured to add the further result to the result. The processing units may repeat the further operations and add the further result to the result until the result satisfies the criterion. The processing units can be configured to skip the further operations based on determination that the result satisfies the criterion.

The mathematical operations may include a multiplication. A count of the mathematical operations performed on the selected pairs and the selected further pairs can be less than the count of all pairs in the plurality of pairs. An order of the selected pairs and the selected further pairs used in performing the mathematical operations can be different from an order of pairs in the received plurality of pairs.

The selecting the pairs from the plurality of pairs can based on absolute values of at least one of the first values or second values of the pairs. The selecting the further pairs from the plurality of pairs can be based on absolute values of at least one of the first values or second values of the further pairs. A pair of the plurality of pairs having a larger absolute value of the first value or the second value can be selected prior to a pair of the plurality of pairs having a lesser absolute value of the first value or the second value.

The selecting the pairs from the plurality of pairs can be based on values of bits of binary numbers representing the first values or the second values of the pairs. A pair with the first value having the first non-zero bit at a position K starting from the least significant bit can be selected prior to a pair with the first value having the first non-zero bit at a position K−1, wherein K is less than a count of bits of a binary number representing the first value. A pair with the second value having the first non-zero bit at a position K starting from the least significant bit can be selected prior to a pair with the second value having the first non-zero bit at a position K−1, wherein K is less than a count of bits of a binary number representing the second value.

The processing units can be configured to modify the first values or the second values of unselected pairs of the plurality pairs. The modifying of the first values or the second values can include setting the first values to zero or setting the second values to zero. Selecting a pair from the plurality of pairs may include setting an enable bit associated with the selected pair. The processing units can be configured to determine that the enable bit is set for the pair. In response to the determination, the processing units can perform the mathematical operations on the pair.

Selecting a pair from the plurality of pairs may include setting an index equal to a position of the pair in the plurality of pairs or in a subset of the plurality of pairs.

The determination that the result satisfies the criterion may include comparing the result to one or more thresholds. The determination that the result satisfies the criterion may include comparing numbers, wherein at least one of the compared numbers is determined based on one of: the result, a first value, or a second values of a pair of the plurality of pairs.

At least one of the processing units is implemented in an electronic circuit. The plurality of pairs may include pairs including input values for the neuron and weights corresponding to the input values. The receiving of the plurality of pairs may include receiving a first plurality of the first values and a second plurality of the second values, wherein a first value of the first plurality is associated with a second value of the second plurality. The plurality of the pairs can be generated based on the first plurality and the second plurality.

According to another example embodiment, a method for accelerating neuron computations in an artificial neural network (ANN) is provided. The method may include receiving, by one or more processing units, a plurality of pairs. The pair may include first values and second values. The plurality of pairs can be used for calculation of a neuron of an ANN. The method may select, by the processing units, one or more pairs from the plurality of pairs. A count of the selected pairs can be less than a count of all pairs in the plurality of pairs. The method may perform, by the processing units, mathematical operations on the selected pairs to obtain a result. The method may determine, by the processing units, that the result does not satisfy a criterion. Upon determining that the result does not satisfy the criterion, the method may perform, by the processing units, further operations. The further operations may include selecting one or more further pairs from the plurality of pairs and performing the mathematical operations on the selected further pairs to obtain a further result. The method may add the further result to the result. The method may repeat the further operations until the result satisfies the criterion. The method may determine, by the processing units and based on the result and the further result, an output of the neuron.

According to another example embodiments, a system for accelerating neuron computations in an artificial neural network (ANN) is provided. The system may include one or more processing units configured to receive a first plurality of input values for a neuron of an ANN and a second plurality of weights associated with the input values. The processing unit may select one or more input values from the first plurality such that each of the selected input values has a no-zero bit at a position of the most significant bit. The processing unit may perform mathematical operations on the selected input values of the first plurality and weights of the second plurality that correspond to the selected input values to obtain a result. The processing units may determine that the result does not satisfy a criterion. The processing units may repeat until the result satisfies the criterion:

a) selecting one or more further input values from the first plurality, wherein each of the further values have not been previously selected and having a first non-zero bit at a position other than the position of the most significant bit;

b) performing the mathematical operations on the selected further input values of the first plurality and weights from the second plurality that correspond to the selected further input values to obtain a further result; and c) adding the further result to the result.

The processing units may further determine, based on the result, an output of the neuron.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and, in which.

DETAILED DESCRIPTION

Figure 1:
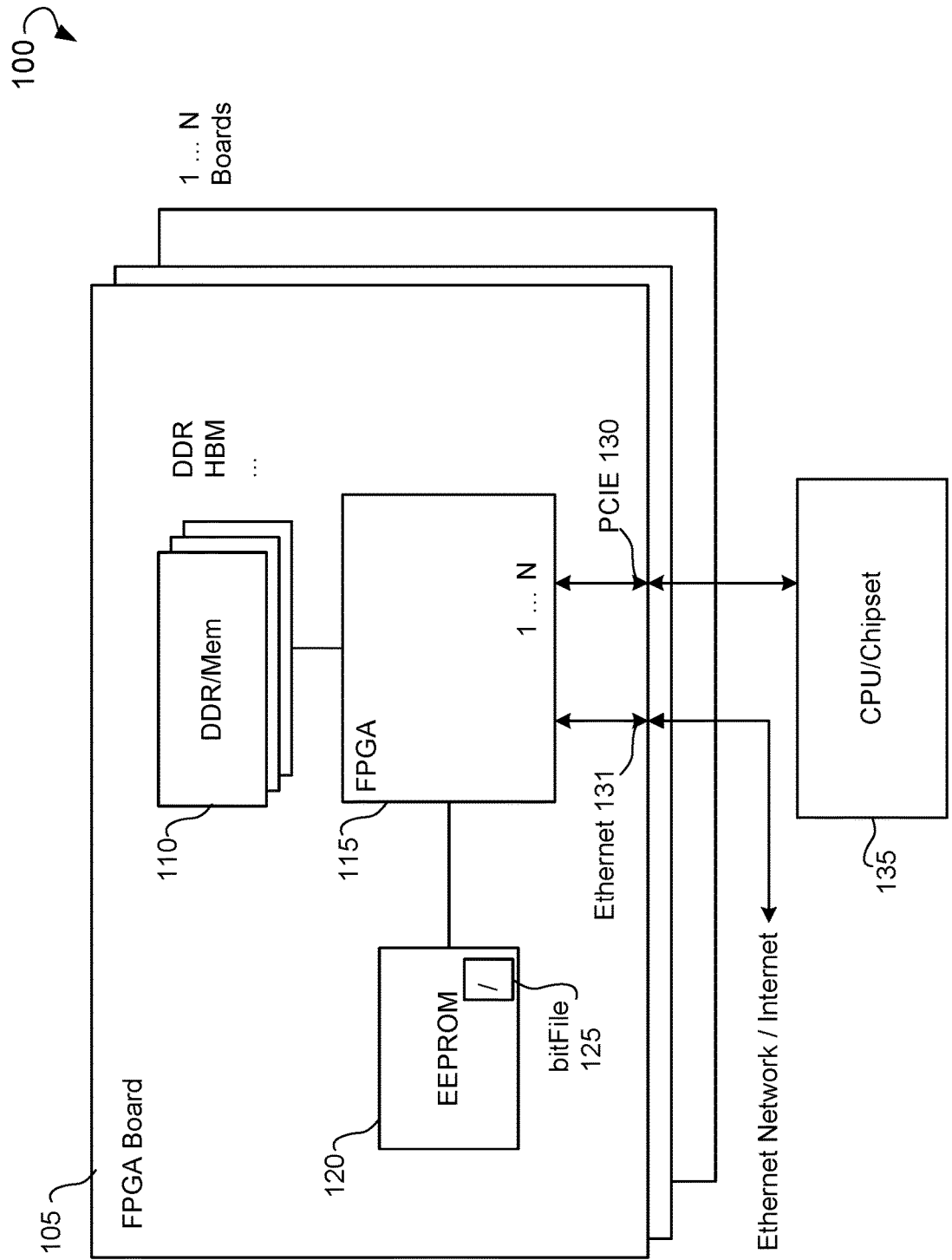
FIG. 1 is a block diagram showing an example system wherein a method for acceleration of neuron computation in ANNs can be implemented, according to some example embodiments.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

For purposes of this document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Embodiments of this disclosure are concerned with methods and systems for accelerating neuron computations in ANNs. Embodiments of present disclosure may accelerate computation of neurons in ANNs by selecting or sorting input data used for neuron computations.

According to some example embodiments of the present disclosure, a system for accelerating neuron computations in ANNs may include one or more processing units configured to receive input values for a neuron of an ANN and weights associated with the input values. The processing units can select one or more values from the input values. A count of selected input values can be less than a total count of input values of neurons. The processing units may calculate a sum of products of the selected input values and weights that correspond to the selected input values to obtain a result. The processing units can further determine whether the result satisfies criteria. If the result does not satisfy the criteria, the processing units may select further input values from those input values that have not been selected yet. The processing units may calculate a further sum of products of the selected further input values and weights that correspond to the selected further input values and add the sum of the further products to the result. The selection of the further input values and calculations of further sums of products can be repeated until the result satisfies the criteria. The determination that the result satisfies criteria may include comparing the result to one or more thresholds. The determination that the result satisfies criteria may include comparing the result to the selected input values or unselected input values.

The selection of input values can be performed based on absolute values of the input values. The input values having larger absolute values can be selected earlier than the input values having smaller absolute values. The selection of the input values can be also based on positions of the first non-zero bit in the input values. The input values having the first non-zero bit at positions further from the least significant bit can be selected prior to the input values having the first non-zero bits at positions closer to the least significant bit.

According to some other example embodiments of the present disclosure, a system for accelerating neuron computations in ANNs may include one or more processing units configured to receive input values for a neuron of an ANN and weights associated with the input values. The processing units can sort, based on a sorting rule, the input values to obtain an ordered list of the input values. The processing units may calculate a partial sum of products of the first input values from the ordered list and weights that correspond to the first input values to obtain a result. The processing units can determine whether the result satisfy criteria. If the result satisfies the criteria, the processing unit may stop the calculation of the partial sum. If, on the other hand, the result does not satisfy the criteria, the processing units may continue calculating the partial sum by adding products of further values in the sorted list and corresponding weights. The determination that the result satisfies criteria may include comparing the result to one or more thresholds, or comparing the result to the input values.

According to another example embodiment, the processing unit may receive a first plurality of input values for neuron of ANN and the second plurality of weights corresponding to the input values. The processing units can sort, based on a sorting rule, pairs of the input values and the weights. The rule may define an order from the most significant pair of the input values and weights to the least significant pair of the input values and weights. The correspondence between the input values and the weights can be kept during the sorting the pairs. The processing units can perform mathematical operations on a sorted list of pairs starting with the most significant pair and towards to the least significant pair and accumulate intermediate result of mathematical operations (for example, a sum of products of the input values and weights in the sorted list of pairs) to a result. The processing units may determine that the result satisfies a criterion. Upon determination that the result satisfies the criterion, the processing unit may stop performing mathematical operations on further pairs in the sorted list of pairs before reaching the least significant pair. The processing units can determine, based on the result, an output of the neuron.

The sorting of pairs of the input values and the weights can be a simple sorting based on the input values, a simple sorting based on the weights, or a more complex sorting. For example, the sorting of the pairs can be based on a sum of a position of the most significant bit in the input value and a position of the most significant bit in the corresponding weight. A pair with a higher sum of the positions of the most significant bits in the input value and the weight can have a higher order in the sorted list of pairs than a pair with a lower sum of the positions of the most significant bits.

Some embodiments of the present disclosure can be implemented using integrated circuits, such as application-specific integrated circuits (ASICs), programmable logic devices, transistor-based circuits, or various combinations thereof. In some embodiments, the ASICs may include one or more FPGAs. The methods described herein can be also implemented by hardware units, software modules, or combinations of both. The methods can also be embodied in computer-readable instructions stored on computer-readable media.

The term "module" shall be construed to mean a hardware device, software, or a combination of both. For example, a hardware-based module can use one or more microprocessors, ASICs, FPGAs, programmable logic devices, transistor-based circuits, or various combinations thereof. Software-based modules can constitute computer programs, computer program procedures, computer program functions, and the like. In addition, a module of a system can be implemented by a computer or server, or by multiple computers or servers interconnected into a network. Alternatively, module may also refer to a subpart of a computer system, a hardware device, an integrated circuit, or a computer program.

Technical effects of certain embodiments of the present disclosure can include configuring integrated circuits, ASICs, FPGAs, or computer systems to perform ANN computations without execution of redundant and unnecessary mathematical operations, thereby accelerating the ANN computations. Further technical effects of some embodiments of the present disclosure can facilitate configuration of integrated circuits, ASICs, FPGAs, or computer systems to dynamically qualify data on which mathematical operations are to be performed in the ANN computations.

Referring now to the drawings, exemplary embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 is a block diagram showing an example system 100, wherein a method for accelerating neuron computations in ANN can be implemented, according to some example embodiments. The system 100 can be part of a computing system, such as a personal computer, a server, a cloud-based computing recourse, and the like. The system 100 may include one or more FPGA boards 105 and a chipset 135 including a least one CPU. The chipset 135 can be communicatively connected to the FPGA boards 105 via a communication interface. The communication interface may include a Peripheral Component Interconnect Express (PCIE) standard 130. The communication interface may also include an Ethernet connection 131.

The FPGA board 105 may include an FPGA 115, a volatile memory 110, and a non-volatile memory 120. The volatile memory 110 may include a double data rate synchronous dynamic random-access memory (DDR SDRAM), High Bandwidth Memory (HBM), or any other type of memory. The volatile memory 110 may include the host memory. The non-volatile memory 120 may include Electrically Erasable Programmable Read-Only Memory (EEPROM), a solid-state drive (SSD), a flash memory, and so forth.

The FPGA 115 can include blocks. The blocks may include a set of elementary nodes (also referred to as gates) performing basic hardware operations, such as Boolean operations. The blocks may further include registers retaining bit information, one or more memory storage of different sizes, and one or more digital signal processors (DSPs) to perform arithmetic computations (for example, additions and multiplications). Programming of FPGA 115 may include configuring each of the blocks to have an expected behavior and connecting the blocks by routing information between the blocks. Programming of FPGA 115 can be carried out using a result from a compiler taking as input schematic description, gate-level description, hardware languages like Verilog, System Verilog, or Very High Speed Integrated Circuit Hardware Description Language (VHDL), or any combination of thereof.

The non-volatile memory 120 may be configured to store instructions in a form of bit file 125 to be executed by the FPGA 115. The FPGA 115 can be configured by the instructions to perform one or more floating point operations or bitwise operations including multiplication and addition to calculate sum of products that can be used in neural network computations.

The volatile memory 110 may be configured to store weights W[i] for neurons of one or more ANNs, input values V[i] to be processed for the ANNs, and results of ANNs computation including any intermediate results of computations of layers of the ANNs.

Figure 2:
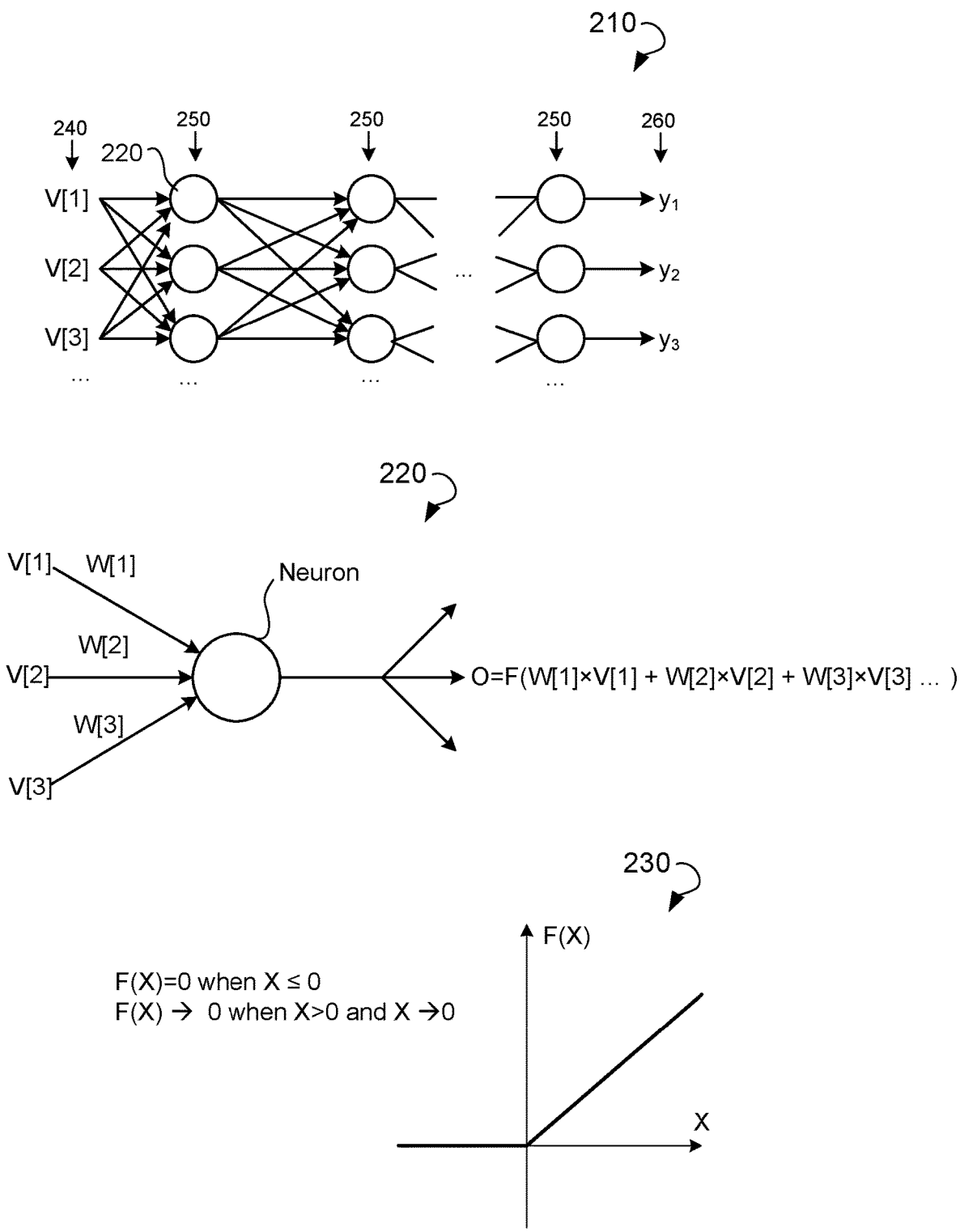
FIG. 2 shows an ANN, neuron, and transfer function, according to an example embodiment.

FIG. 2 shows ANN 210, neuron 220, and transfer function 230, according to some example embodiments. The ANN 210 may include one or more input layers 240, one or more hidden layers 250, and one or more output layers 260. Each of the input layers, hidden layers, and output layers may include one or more (artificial) neurons 220. The number of neurons can be different for different layers.

Each of neurons 220 may represent a calculation of a mathematical function $$O = F\left(\sum_{i=1}^{n} V[i] \times W[i]\right) \qquad (1)$$

wherein V[i] are neuron input values, W[i] are weights assigned to input values at neuron, and F(X) is a transfer function. Typically, the transfer function 230 F(X) is selected to be zero for X<0 and have a limit of zero as X approaches zero. For example, the transfer function F(X) can be in the form of a sigmoid. The result of calculation of a neuron propagates as an input value of further neurons in the ANN. The further neurons can belong to either the next layer, previous layer, or the same layer.

It should be noted that while the ANN 210 illustrated in FIG. 2 can be referred to as a feedforward neural network, embodiments of the present disclosure can be also used in computations of CNNs, recurrent neural networks, long short-term memory networks, and other types of ANNs.

Figure 3:
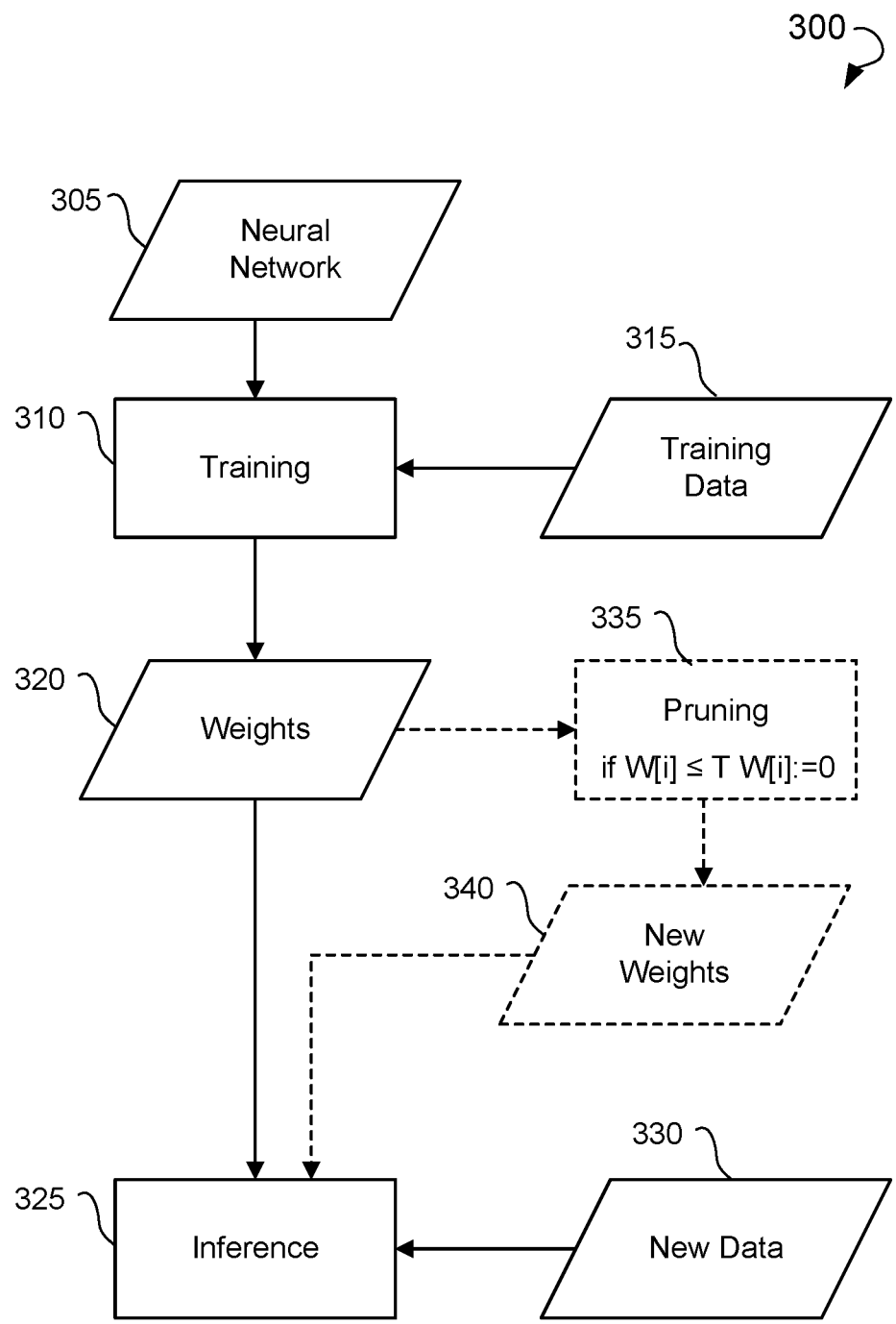
FIG. 3 is a flow chart showing training and inference of ANN, according to some example embodiments.

FIG. 3 is a flow chart 300 showing training 310 and inference 325 of an ANN 305, according to some example embodiments. The training 310 (also known as learning) is a process of teaching ANN 305 to output a proper result based on a given set of training data 315. The process of training may include determining weights 320 of neurons of the ANN 305 based on training data 315. The training data 315 may include samples. Each of the samples may be represented as a pair of input values and an expected output. The training data 315 may include hundreds to millions of samples. While the training 310 is required to be performed only once, it may require a significant amount of computations and take a considerable time. The ANNs can be configured to solve different tasks including, for example, image recognition, speech recognition, handwriting recognition, machine translation, social network filtering, video games, medical diagnosis, and so forth.

The inference 325 is a process of computation of an ANN. The inference 325 uses the trained ANN weights 320 and new data 330 including new sets of input values. For each new set of input values, the computation of the ANN provides a new output which answers the problem that the ANN is supposed to solve. For example, an ANN can be trained to recognize various animals in images. Correspondingly, the ANN can be trained on millions of images of animals. Submitting a new image to the ANN would provide the information for animals in the new image (this process being known as image tagging). While the inference for each image takes less computations than training, the number of inferences can be large because new images can be received from billions of sources.

The inference 325 includes multiple computations of a sum of products:

$$\sum_{i=1}^{n} V[i] \times W[i] \quad (2)$$

Wherein the V[i] are new input values and W[i] are weights associated with neurons of ANN. Some previous approaches for performing inference include inspection of the weights W[i] and replacing some of the weights W[i] with zero values if a value of the weight is relatively small when compared to other weights of the ANN. In FIG. 3, this process is shown as pruning 335. The pruning 335 generates new weights 340 that then can be used in inference 325 instead of the weights 320. An advantage of these approaches is that replacing the weights with zero values may allow decreasing the number of computations of the ANN, since multiplications by zero can be avoided in computations. The disadvantage of these approaches is that the ANN can become less accurate in producing a correct output due to lack of correspondence between the new weights 340 and training data 315 used in training of ANN. Another disadvantage of these approaches is that the pruning of weights is not based on new input values and allows avoidance only of operations with weights equal to zero.

Figure 4:
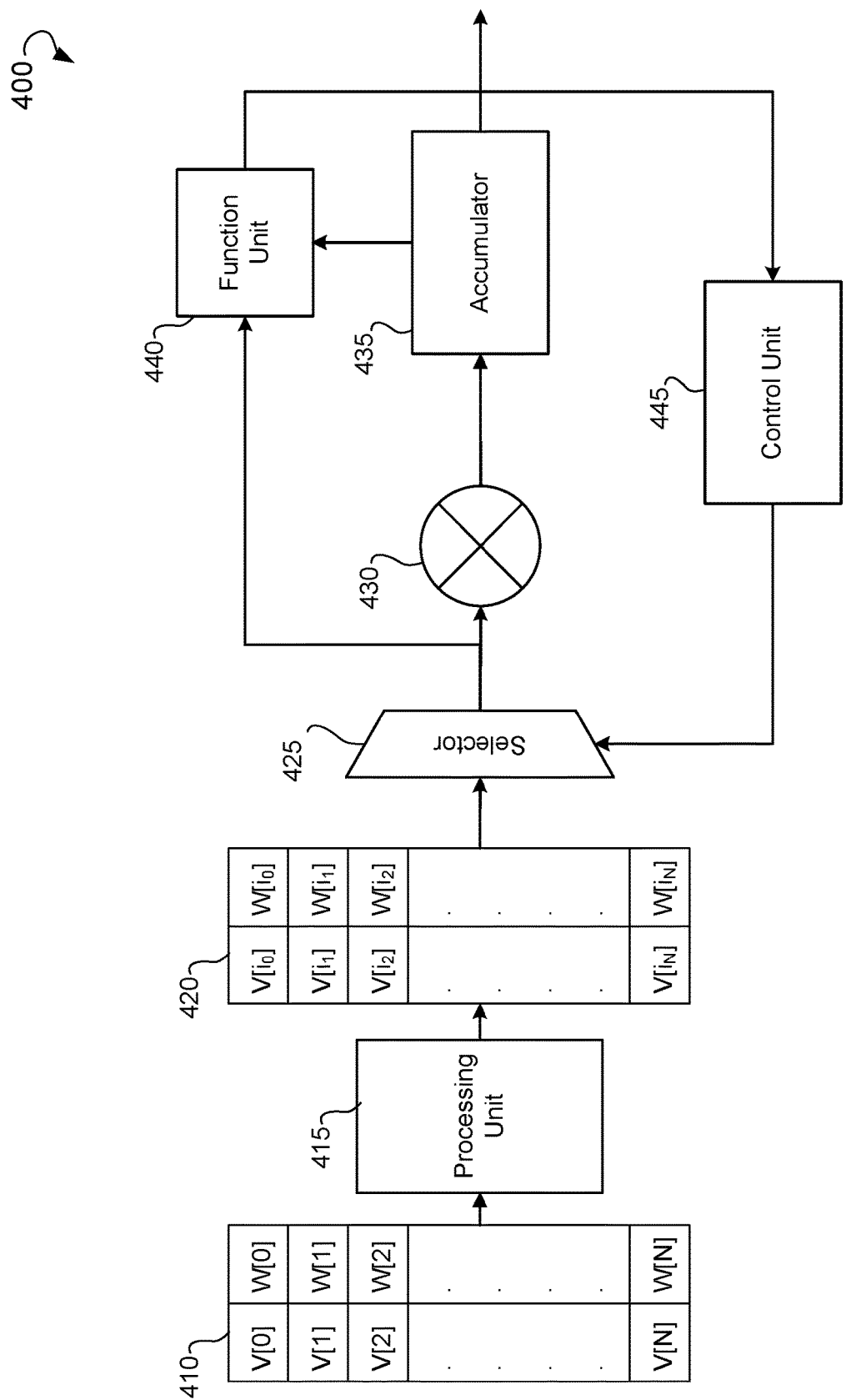
FIG. 4 is a block diagram showing an example system for accelerating neuron computations in ANN, according to some example embodiments.

FIG. 4 is a block diagram showing an example system 400 for accelerating neuron computations in ANNs, according to some example embodiments of the present disclosure. The system 400 may include a processing unit 415, a selector 425, an arithmetic unit 430, an accumulator 435, and a function unit 440. One or more components of the system 400 can be implemented using electronic components, ASICs and other integrated circuits (for example, using FPGAs 105).

The processing units 415 can be configured to receive input data 410. The input data 410 may include values V[i] and weights W[i], i=0, ..., N, for calculation of a neuron of the ANN. The processing unit 415 may sort the input values V[i] and generate sorted input data 420. The pairs (V[i], W[i]) can be sorted based on values of the input values V[i]. For example, the sorting of the input values V[i] can be performed based on absolute values of the input values V[i] in a descending order. Similarly, in other embodiments, the pairs (V[i], W[i]) can be sorted based on absolute values of the weights W[i]. In certain embodiments, the pairs (V[i], W[i]) can be sorted based on absolute values of both input values V[i] and W[i] (for example, based on a sum of absolute values of the input values V[i] and the weights W[i]).

The selector 425 can be configured to select a predetermined number of input values V[i] and corresponding weights W[i] from the sorted input data 420. The selected input value V[i] and the weight W[i] can be provided to the arithmetic unit 430. The arithmetic unit 430 may determine a product of the input value V[i] and the weight W[i]. The product can be further provided to accumulator 435. The accumulator 435 can accumulate products of input value V[i] and the weight W[i] to obtain a result.

The function unit 440 can be configured to determine that the result satisfies criteria. For example, the function unit 440 can be configured to compare the result to one or more of the thresholds. The function unit 440 can be configured to determine that the result either exceeds a positive threshold or does not exceed a negative threshold. The function unit 440 can be also configured to determine that a result is close to saturation of the neuron. In these cases, the result satisfies the criteria, and computation of products and accumulation of the products of further input values V[i] and weights W[i] in the sorted input data 420 can be skipped to reduce a number of mathematical computations required to calculate a sum of product of all input values V[i] and W[i] in the input data 410.

In other embodiments, the selector 425 can be configured to provide input value V[i] currently selected from the sorted input data 420 to the function unit 440. The function unit 440 can compare the result to one or more first thresholds and the input value to one or more second thresholds. If the result either exceeds a first positive threshold or does not exceed a first negative threshold while the input value V[i] is between a second negative threshold and a second positive threshold, the result satisfies criteria, and computation of a sum of products of further input values V[i] and weights W[i] in the sorted input data 420 can be skipped.

In certain embodiments, the function unit 440 can compare the input value V[i] to a percentage of the result. If the input value V[i] does not exceed the percentage of the result, then the result satisfies the criteria, and computation based on further input values V[i] and weights W[i] corresponding to the further input values V[i] can be also skipped.

In those embodiments when the sorted input data 420 are sorted based on weights W[i], the selector 425 can be configured to provide current weight W[i] selected from the sorted input data 420. The function unit 440 can determine whether the result satisfies criteria based on the value of the current W[i] and the value of the result. In other embodiments, when the sorted input data 420 are sorted based on both the input values V[i] and the weights W[i], the selector 425 may be configured to provide both current input values V[i] and weights W[i] to the function unit 440. The function unit 440 can determine whether the result satisfies the criteria based on the current values of the input values V[i], weights W[i], and the result.

The function unit 440 can provide an indication whether the result satisfies criteria to a control unit 445. If the result satisfies the criteria, then the control unit 445 can configure the selector 425 to skip further input values V[i] and corresponding weights W[i], so the arithmetic unit 430 and the accumulator 435 would not perform operations on the further input values V[i] and weights W[i] from the sorted input data 420.

In some embodiments, the processing unit 415 and/or the function unit 440 can be configured to receive other values V[j] and other weights W[k], wherein j and k can be different than i=0, . . . , N. Indexes j and k can be the same or different. The function unit 440 can determine that the result satisfies the criteria based on one or more of the input values V[j] or weights W[k]. Optionally, the function unit 440 can determine that result satisfies the criteria based on the input values V[i] and the weights W[i]. In other embodiments, the determination that the result satisfies the criteria may be based on a value of a function defined by a mathematical formula which depends on the result, the input values V[i], the input weights W[i], other input values V[j], other input weights W[j], thresholds, constants, and any subset or a combination of thereof.

It should be noted that while sorting data can be easily implemented using software-based processing units, it may not be efficient to implement sorting data using hardware-based processing units, such as FPGAs or ASICs. Therefore, instead of performing complete sorting, the input data can be sorted partially. For example, a subset of the input data 410 for a neuron can be selected by applying a filter to the input data 410. Filtering of the input data may require less hardware units than the complete sorting. The computation of the neuron can be performed based on the selected subset of the input data to obtain a partial result. If the partial result does not satisfy criteria, then selection of a next subset of input data can be repeated for those input data that have not been selected yet and a next partial result can be calculated and accumulated to a total result, which includes all previous partial results. The selection of subsets of the input data and accumulating of the partial results of the computations based on selected input data can be repeated until the total result satisfies the criteria or all the input data have been selected.

In some embodiments, the filtering of the input data can be performed based on a position of the first non-zero bit in the input data V[i] or the weights W[i]. The position of the first non-zero bit can be counted starting with the least significant bit in the input values V[i] or the weight W[i]. In some embodiments, if each of the input values V[i] includes M bits, the pairs (V[i] and W[i]) wherein the input value V[i] has the first non-zero bit at position of the most significant bit M−1 can be selected in the first subset. If a partial result after calculation of neuron based on the first subset does not satisfy criteria, then the pairs (V[i] and W[i]) wherein the input value V[i] has the first non-zero bit at position M−2 can be selected in the second subset, and so forth. The selection of subsets of the pairs (V[i] and W[i]) and accumulating the partial result to the total result can be performed until the total result satisfies criteria.

Figure 5:
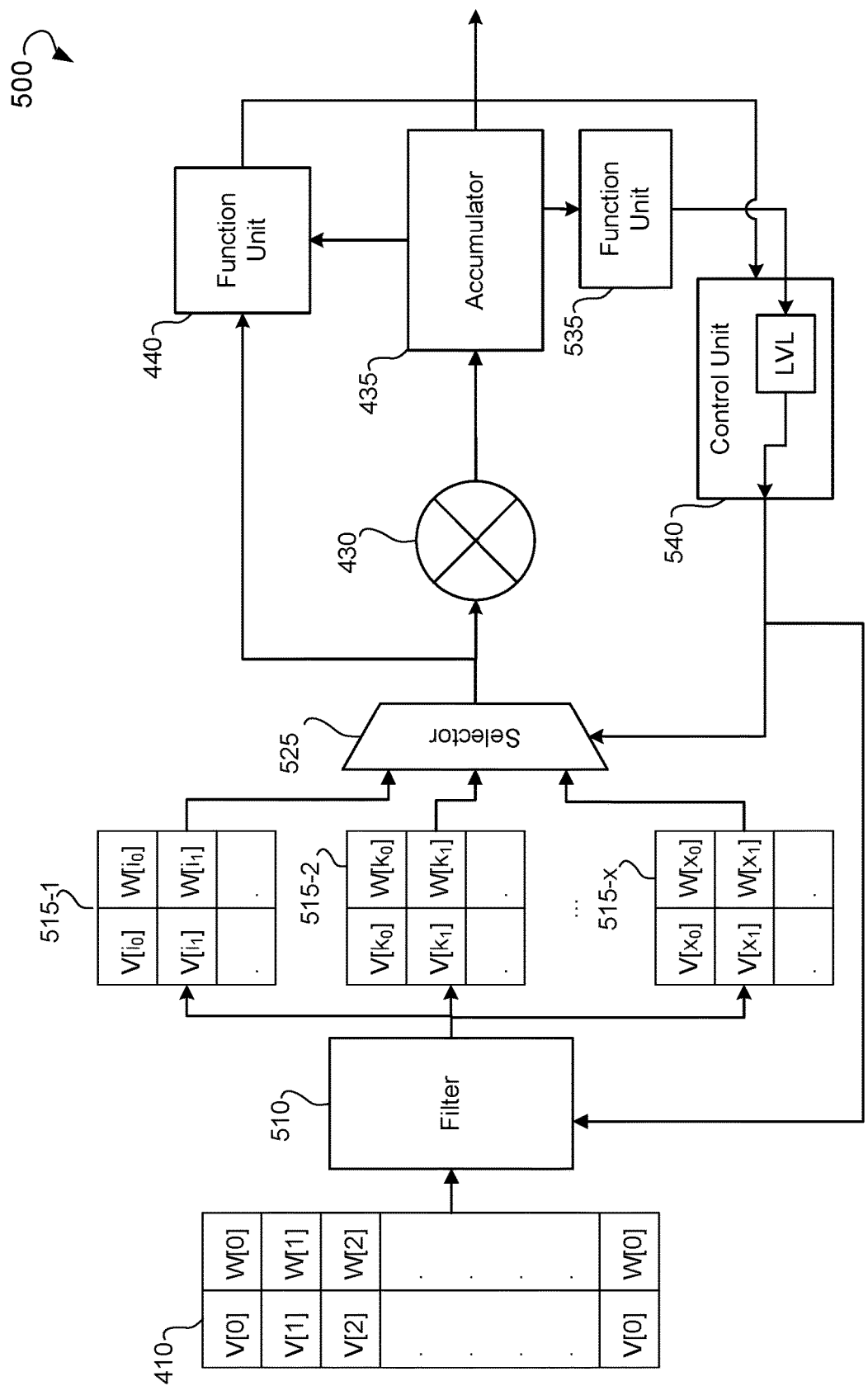
FIG. 5 is a block diagram showing an example system for accelerating neuron computations in ANN, according to some example embodiments.

FIG. 5 is a block diagram showing an example system 500 for accelerating neuron computations in ANN, according to some example embodiments of the present disclosure. The system 500 may include a filter 510, a selector 525, an arithmetic unit 430, an accumulator 435, a function unit 440, a function unit 535, and a control unit 540. One or more components of the system 500 can be implemented using electronic components (for example, using FPGAs 105).

The filter 510 can be configured to receive input data 410 including input values V[i] and weights W[i] for computation of a neuron of an ANN. The filter 510 can partially sort the input data 410 to obtain a partially sorted input data. The partially sorted input data may start with a first subset 515-1 of pairs (V[i], W[i]), wherein all input values V[i] have the first non-zero bit at a position of the most significant bit M−1, wherein the M is a number of bits in each input value V[i]. After the first subset 515-1, the partial sorted input data may include a second subset 515-2 of pairs (V[i], W[i]), wherein all input V[i] have the first non-zero bit at position of M−2, and so forth. The last subset 515-x in the partially sorted input data may include pairs (V[i], W[i]), wherein all input values V[i] have the first non-zero bit at position of M-x. The position M-x can be equal to a position of the least significant bit in input value V[i]. In some embodiments, subsets of pairs (V[i], W[i])) wherein input values V[i] have the first non-zero bit at a position less than a pre-determined number M-X exceeding the position of the least significant bit in input values V[i] may not be included in the partially sorted input data.

The selector 525 can be configured to select a pre-determined number of input values V[i] and corresponding weights W[i] from the partially sorted input data. The selected input value V[i] and the weight W[i] can be provided to the arithmetic unit 430. The arithmetic unit 430 may determine a product of the selected input value V[i] and the weight W[i]. The product can be further provided to accumulator 435. The accumulator 435 can accumulate products of input value V[i] and the weight W[i] to obtain a result.

The function unit 440 can be configured to determine that the result satisfies criteria. For example, the function unit 440 can be configured to compare the result to one or more of the thresholds. The function unit 440 can be configured to determine that the result either exceeds a positive threshold or does not exceed a negative threshold. The function unit 440 can be also configured to determine that a result is close to saturation of the neuron. In these cases, the result satisfies the criteria, and computation of products and accumulation of the product of further input values V[i] and weights W[i] in the partially sorted input data can be skipped. In some embodiments, the function unit 440 can determine that the result satisfies the criteria based on a value of the currently selected input value V[i] and a value of the result.

The function unit 440 can provide an indication whether the result satisfies criteria to the control unit 540. If the result satisfies the criteria, then the control unit 540 can configure the selector 525 to skip further input values V[i] and corresponding weights W[i] from the partially sorted input data, so the arithmetic unit 430 and the accumulator 435 would not perform operations on the further input values V[i] and weights W[i] from the partially sorted input data.

The function unit 535 can be configured to track a position of the first non-zero bit in the input values V[i] currently selected by the selector 525. The function unit 535 may provide the position of the first non-zero bit in the input values V[i] to the control unit 540. If the position of the first non-zero bit in the input values V[i] becomes below a pre-determined value, then the control unit 540 can configure the selector 525 to skip further input values V[i] and corresponding weights W[i] from the partially sorted input data, so the arithmetic unit 430 and the accumulator 435 would not perform operations on the further input values V[i] and weights W[i] from the partially sorted input data.

In some other embodiments, the function unit 535 may receive the result of the accumulator 435. The function unit 535 can determine, based on the result, a maximum allowable value of positions of the first non-zero bit. The function unit 535 can determine that the first non-zero bit in the input values V[i] currently selected by the selector 525 is below the maximum allowable value and provide an indication to the control unit 540. In response to receiving the indication, the control unit 540 can configure the selector 525 to skip further input values V[i] and corresponding weights W[i], so the arithmetic unit 430 and the accumulator 435 would not perform operations on the further input values V[i] and weights W[i] from the partially sorted input data.

In some embodiments, the filter 510 may generate a list of positions. The positions can indicate an order in which the input values V[i] and the weights W[i] are to be processed by the selector 525. In some embodiments, the filter 510 may generate a set of enable bits indicating which of the values V[i] and weights W[i] are to be processed by the selector 525.

In some other embodiments, the selector 525 can select the first inputs values V[i] and the first weights W[i] for the arithmetic unit 430 to start performing calculation on the input values V[i] and the weights W[i]. When the selector 525 starts selecting the first input values and the first weights, the control unit 540 can configure the filter 510 to partially select or sort further input values V[i] and weights W[i].

In some embodiments, the process of partial sorting of the input values V[i] and weights W[i] can be performed by generating sets $S_k$ of pairs (V[i], W[i]) without reordering the input values V[i] and weights W[i]. Each of the sets $S_k$ of pairs (V[i], W[i]) can be generated from initial input values V[i] and weights W[i] by replacing, with zero, all the input values V[i] having the first non-zero bit at a position K. Each of the generated sets $S_k$ of pairs (V[i], W[i]) can be further filtered to remove the pairs (V[i], W[i]) wherein the input value V[i] is zero. The rest of pairs (V[i], W[i]) in the set $S_k$ can be used to calculate a sum of products of input values V[i] and weights W[i] to obtain a partial result for the set $S_k$. The generation of the set $S_k$ and computation of the partial results can be performed sequentially starting with a set corresponding to position K equal to the most significant bit M−1 and decreasing K to a pre-determined maximum position. The partial results can be accumulated to a total result. The generating the sets $S_k$ and computation of the partial results can be stopped if the total result satisfies criteria.

Figure 6:
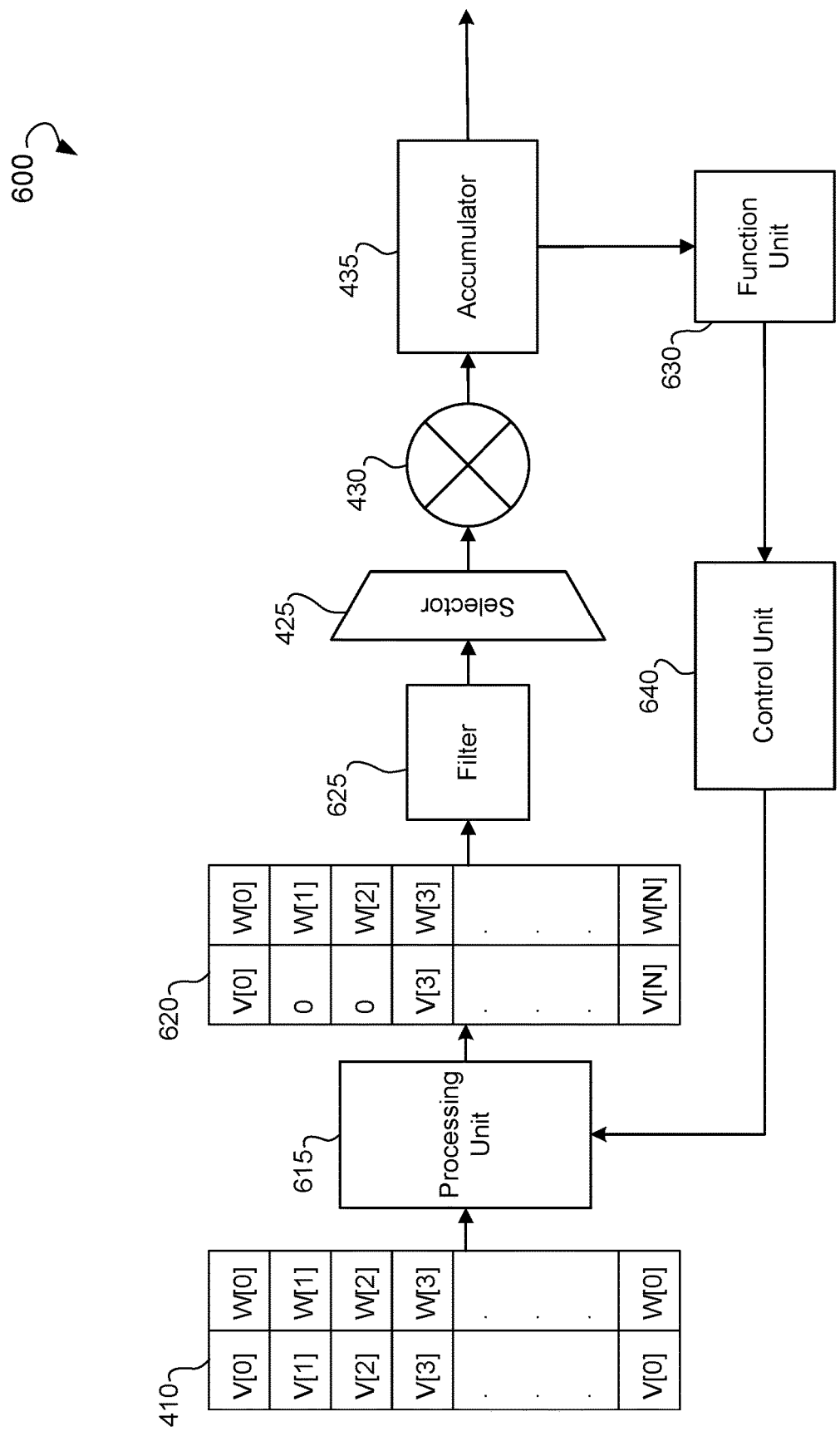
FIG. 6 is a block diagram showing an example system for accelerating neuron computations in ANN, according to some example embodiments.

FIG. 6 is a block diagram showing an example system 600 for accelerating neuron computations in ANN, according to some example embodiments of the present disclosure. The system 600 may include a processing unit 615, a filter 625, a selector 425, an arithmetic unit 430, an accumulator 435, a function unit 630, and a control unit 640. One or more components of the system 600 can be implemented using electronic components (for example, using FPGAs 105).

The processing unit 615 can be configured to receive input data 410 including input values V[i] and weights W[i] for computation of a neuron of an ANN. Based on the input data 410, the processing unit 615 can generate, input data 620. The input data 620 can be generated by copying all the input data 410 and replacing, with zero, input values V[i] having the first non-zero at position K. At the beginning of computation of a neuron, the position K can be selected to be a position of the most significant bit in the input values V[i]. The order of pairs (V[i], W[i]) in the input data 620 can be kept the same as in the input data 410.

The filter 625 can be configured to only provide to the selector 425 pairs (V[i], W[i]) wherein the input values V[i] is non-zero. The selected input value V[i] and the weight W[i] can be provided to the arithmetic unit 430. The arithmetic unit 430 may determine a product of the selected input value V[i] and the weight W[i]. The product can be further provided to accumulator 435. The accumulator 435 can accumulate products of input value V[i] and the weight W[i] to obtain a result.

The function unit 630 can be configured to determine that the result satisfies criteria. For example, the function unit 630 can be configured to compare the result to one or more of the thresholds. The function unit 630 can be configured to determine that the result either exceeds a positive threshold or does not exceed a negative threshold. The function unit 630 can be also configured to determine that result is close to saturation of the neuron. In these cases, the result satisfies the criteria, and computation of products and accumulation of the product of further input values V[i] and weights W[i] in the input data can be skipped. In some embodiments, the function unit 630 can determine that the result satisfies the criteria based on a value of the currently selected input value V[i] and a value of the result. For example, the function unit 630 can compare the selected input value V[i] to a percentage of the result and determine that the result satisfies the criteria based on the comparison.

The function unit 630 can provide an indication whether the result satisfies criteria to the control unit 640. If the result does not satisfy the criteria, then the control unit 640 can configure the processing unit 615 to proceed with next position K. If the result satisfies the criteria, the computations of the neuron can be stopped, thereby skipping further input values V[i] and corresponding weights W[i], wherein the first non-zero bit starts at positions further than the position K for the first non-zero bit in input values V[i].

It should be noted that partial selection of pairs (V[i], W[i]) in embodiments described in FIG. 5 and FIG. 6 can be also based on a position of the first non-zero bits in the weights W[i]. The determination that a result satisfies the criteria can be also based on values of selected weights W[i] and/or a position of the first non-zero bit in the selected weights W[i]. It should be also noted that the thresholds described with connection to FIG. 4, FIG. 5, and FIG. 6 can be either pre-determined or dynamically adjusted based on current values of the result, current values of the input values V[i] and weights W[i], and/or a current position of the first non-zero bit in the input values V[i] and weights W[i].

Figure 7:
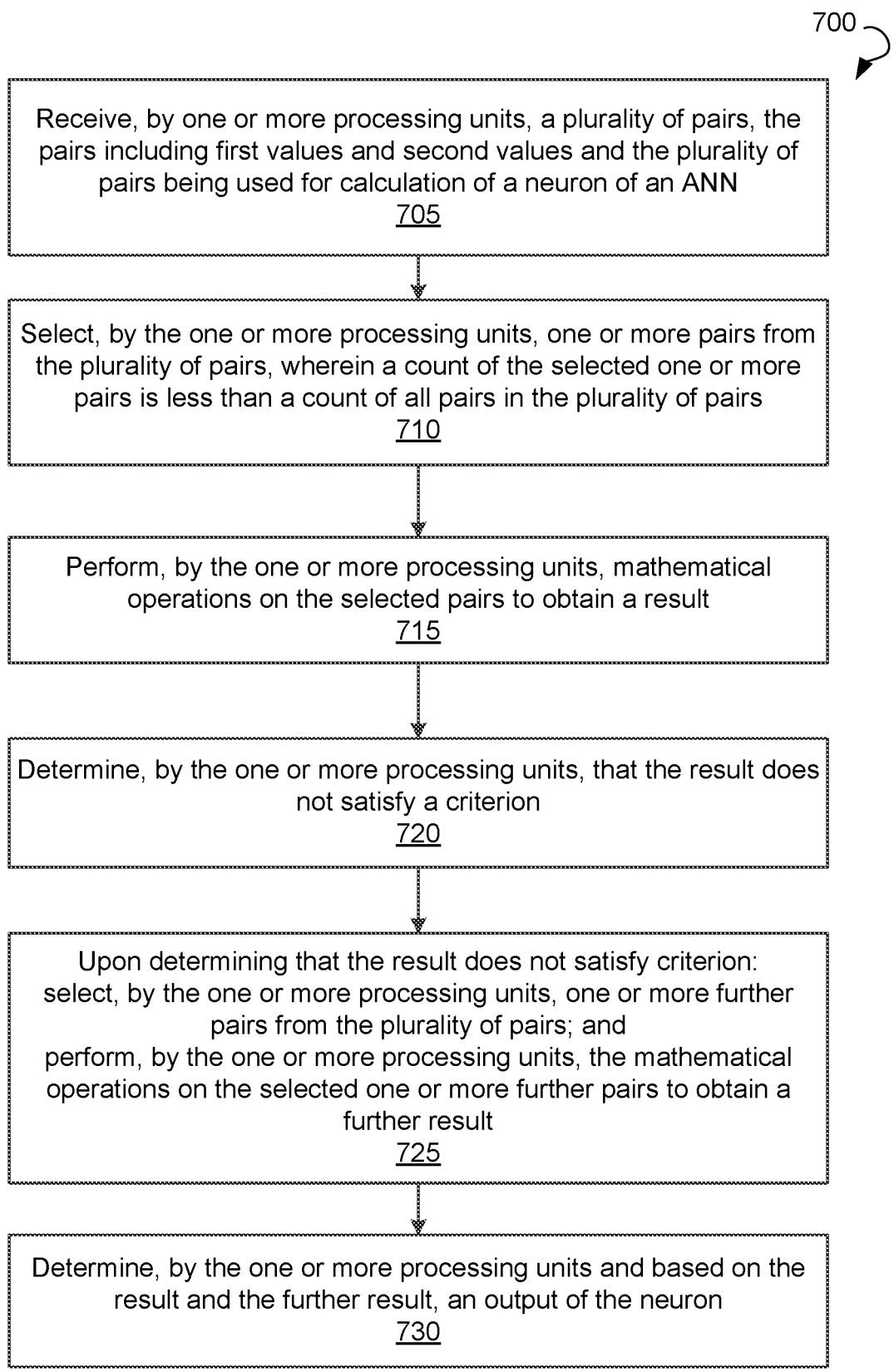
FIG. 7 is a flow chart showing an example method for accelerating neuron computations in ANN, according to some example embodiments.

FIG. 7 is a flow chart showing an example method 700 for accelerating neuron computations in ANN, according to some example embodiments. The method 700 can be performed using one or more processing units. At least one of the processing units can be implemented as an integrated circuit, for example an ASIC or an FPGA. For example, the method 700 can be performed using the system 100 of FIG. 1.

The method 700 may commence, in block 705, with receiving, by one or more processing units, a plurality of pairs, the pair including first values and second values. The plurality of pairs can be used for calculation of a neuron of an ANN. For example, the pairs may include input values of the neuron and weights corresponding to the input values. In some embodiments, the method 700 may receive a plurality of the input values and a plurality of the weights and generate a plurality of pairs, wherein each pair includes an input value from the plurality of input values and corresponding weight from the plurality of the weights.

In block 710, the method 700 may select, by the processing units, one or more pairs from the plurality of pairs. A count of the selected pairs can be less than a count of all pairs in the first plurality.

In block 715, the method 700 may perform, by the processing units, mathematical operations on the selected pairs to obtain a result.

In block 720, the method 700 may determine, by the processing units, that the result does not satisfy a criterion. Determining that the result does not satisfies the criterion may include comparing the result to one or more thresholds. Determining that the result does not satisfies the criterion may include comparing the result to one or more input values or weights in the selected pairs. Also, determining that the result does not satisfies the criterion may include determining a value of a function depending on the result and one or more input values or weights in the selected pairs.

In block 725, upon determining that the result does not satisfy criterion, the method 700 may select one or more further pairs from the plurality of pairs, wherein the one or more further pairs have not been selected yet. The method 700 may perform the mathematical operations on the selected further pairs to obtain a further result. The method 700 may add the further result to the result and repeat operation in block 725 until the result satisfies the criteria.

In some embodiments, the selection of the pairs from the plurality of pairs can be based on absolute values of the first values or the second values of the pairs.

In some embodiment, selecting the pairs from the plurality of pairs can be based on absolute values of the first values or second values of the pairs. Selecting the further pairs from the plurality of pairs can be based on absolute values of the first values or second values of the further pairs. A pair of the plurality of pairs having a larger absolute value of the first value or the second value can be selected prior to a pair of the plurality of pairs having a lesser absolute value of the first value or the second value.

In some embodiments, selecting the pairs from the plurality of pairs can based on values of bits of binary numbers representing the first values or the second values of the pairs. A pair with a first value having the first non-zero bit at a position K starting from the least significant bit can be selected prior to a pair with a first value having the first non-zero bit at a position K−1, wherein K is less than a count of bits of a binary number representing the first value. Additionally, a pair with a second value having the first non-zero bit at a position K starting from the least significant bit can be selected prior to a pair with a second value having the first non-zero bit at a position K−1, wherein K is less than a count of bits a binary number representing the second value.

In block 730, the method 700 may determine, by the one or more processing units and based on the result and the further result, an output of the neuron.

Figure 8:
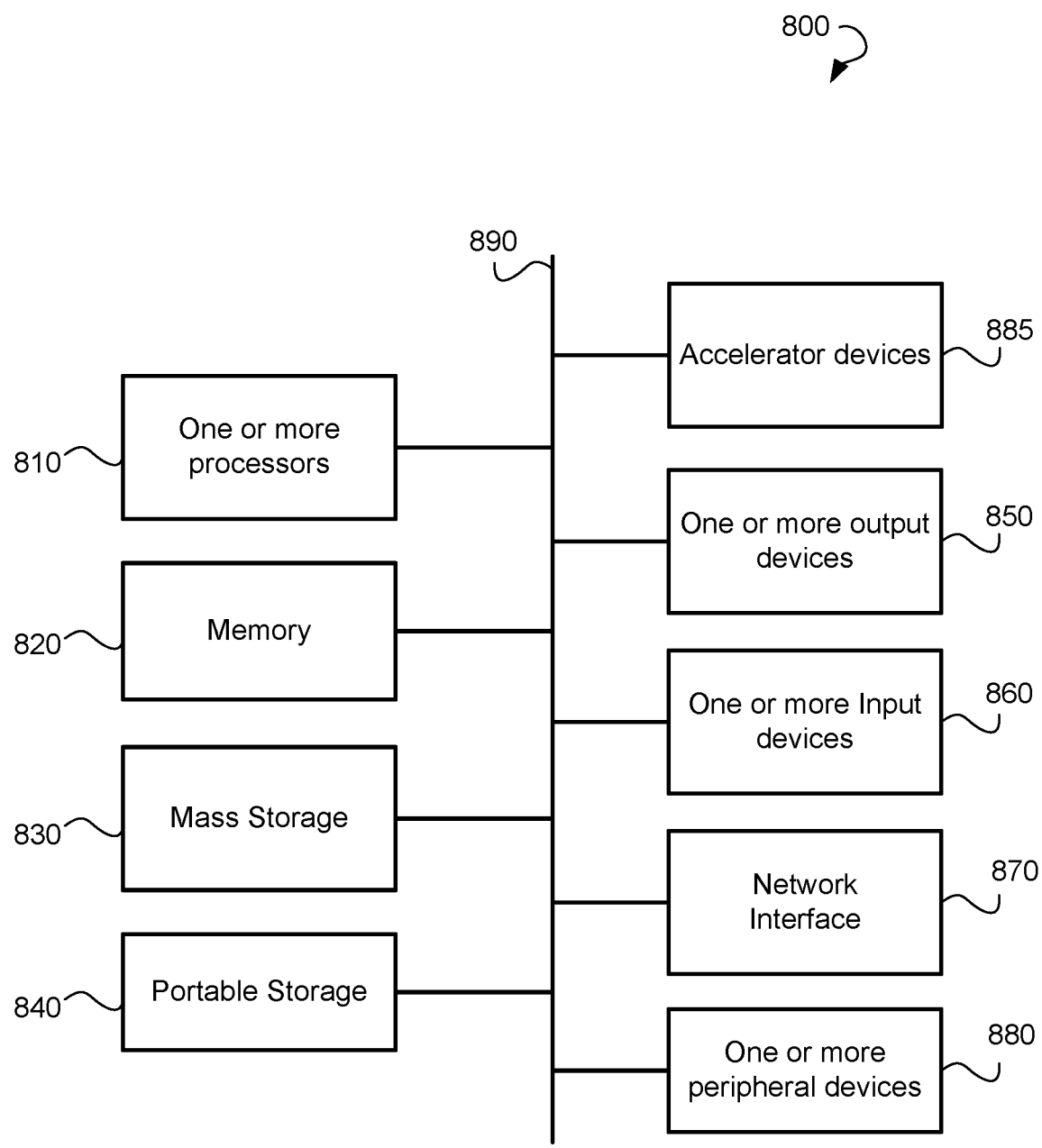
FIG. 8 shows a computing system that can be used to implement embodiments of the disclosed technology.

FIG. 8 illustrates an example computing system 800 that may be used to implement embodiments described herein. The example computing system 800 of FIG. 8 may include one or more processors 810 and memory 820. Memory 820 may store, in part, instructions and data for execution by the one or more processors 810. Memory 820 can store the executable code when the exemplary computing system 800 is in operation. The processor 810 may include internal accelerators like a GPU, a FPGA, or similar accelerators that may be suitable for use with embodiments described herein. The memory 820 may include internal accelerators like a GPU, FPGA, or similar accelerators that may be suitable for use with embodiments described herein. The example computing system 800 of FIG. 8 may further include a mass storage 830, portable storage 840, one or more output devices 850, one or more input devices 860, a network interface 870, and one or more peripheral devices 880.

The components shown in FIG. 8 are depicted as being connected via a single bus 890. The components may be connected through one or more data transport means. The one or more processors 810 and memory 820 may be connected via a local microprocessor bus, and the mass storage 830, one or more peripheral devices 880, portable storage 840, and network interface 870 may be connected via one or more input/output buses.

Mass storage 830, which may be implemented with a magnetic disk drive, an optical disk drive or a solid state drive, is a non-volatile storage device for storing data and instructions for use by a magnetic disk, an optical disk drive or SSD, which in turn may be used by one or more processors 810. Mass storage 830 can store the system software for implementing embodiments described herein for purposes of loading that software into memory 820. The mass storage 830 may also include internal accelerators like a GPU, FPGA, or similar accelerators that may be suitable for use with embodiments described herein.

Portable storage 840 may operate in conjunction with a portable non-volatile storage medium, such as a compact disk (CD) or digital video disc (DVD), to input and output data and code to and from the computing system 800 of FIG. 8. The system software for implementing embodiments described herein may be stored on such a portable medium and input to the computing system 800 via the portable storage 840.

One or more input devices 860 provide a portion of a user interface. The one or more input devices 860 may include an alphanumeric keypad, such as a keyboard, for inputting alphanumeric and other information, or a pointing device, such as a mouse, a trackball, a stylus, or cursor direction keys. Additionally, the computing system 800 as shown in FIG. 8 includes one or more output devices 850. Suitable one or more output devices 850 include speakers, printers, network interfaces, and monitors.

Network interface 870 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 870 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 880 may include any type of computer support device to add additional functionality to the computing system. The one or more peripheral devices 880 may include a modem or a router.

The example computing system 800 of FIG. 8 may also include one or more accelerator devices 885. The accelerator devices 885 may include PCIe-form-factor boards or storage-form-factor boards, or any electronic board equipped with a specific electronic component like a GPU, a Neural Processing Unit, a Multi-CPU component, a FPGA component, or similar accelerators of electronic or photonic components, that may be suitable for use with embodiments described herein.

The components contained in the exemplary computing system 800 of FIG. 8 are those typically found in computing systems that may be suitable for use with embodiments described herein and are intended to represent a broad category of such computer components that are well known in the art. Thus, the exemplary computing system 800 of FIG. 8 can be a personal computer, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, SSD, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. The instructions or data may not be used by the CPU but be accessed in writing or reading from the other devices without having the CPU directing them.

Thus, systems and methods for accelerating neuron computations of ANNs are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for accelerating neuron computations in an artificial neural network (ANN), the system comprising
   a processing unit, implemented as a first electronic circuitry, configured to receive a plurality of pairs, the pairs including first values and second values, the plurality of pairs associated with calculation of an output of a neuron of an ANN during inference of the ANN;
   a selector, implemented as a second electronic circuitry, configured to select a predetermined number of pairs from the plurality of pairs, wherein a count of the selected pairs is less than a count of all pairs in the plurality of pairs and at least one unselected pair includes a nonzero first value and a nonzero second value;
   an arithmetic unit, implemented as a third electronic circuitry, configured to determine products of the selected pairs;
   an accumulator, implemented as a fourth electronic circuitry, configured to accumulate the products to obtain a result; and
   a control unit, implemented as a fifth electronic circuitry, configured to:
   determine that the result does not satisfy a criterion; and
   upon determining that the result does not satisfy the criterion, perform further operations comprising:
   causing the selector to select the predetermined number of further pairs from the plurality of pairs associated with the calculation of same neuron of the ANN during same inference of the ANN;
   causing the arithmetic unit to determine further products of the selected further pairs; and
   causing the accumulator to accumulate the further products with the result to obtain a further result, wherein the further result is used for determination of the output of the neuron;
   wherein an order of the selected pairs and the selected further pairs being processed by the arithmetic unit is different from an order of pairs in the received plurality of pairs.

2. The system of claim 1, wherein the processing unit is configured to repeat the further operations until the further result satisfies the criterion.

3. The system of claim 1, wherein the processing unit is configured to skip the further operations based on determination that the result satisfies the criterion.

4. The system of claim 1, wherein the arithmetic unit is configured to determine the products by a multiplication.

5. The system of claim 1, wherein a count of operations performed by the arithmetic unit on all the selected pairs is less than a count of the operations that would be performed by the arithmetic unit on all pairs in the plurality of pairs.

6. The system of claim 1, wherein:
   the selecting the predetermined number of pairs from the plurality of pairs is based on absolute values of at least one of the first values or second values of the one or more pairs; and
   the selecting the predetermined number of further pairs from the plurality of pairs is based on absolute values of at least one of the first values or second values of the one or more further pairs.

7. The system of claim 6, wherein a pair of the plurality of pairs having a larger absolute value of the first value or the second value is selected prior to a pair of the plurality of pairs having a lesser absolute value of the first value or the second value.

8. The system of claim 1, wherein the selecting the pairs from the plurality of pairs is based on values of bits of binary numbers representing the first values or the second values of the one or more pairs.

9. The system of claim 8, wherein:
   a pair with a first value having a first non-zero bit at a position K starting from a least significant bit is selected prior to a pair with a first value having a first non-zero bit at a position K−1, wherein K is less than a count of bits a binary number representing the first value; or
   a pair with a second value having a first non-zero bit at a position K starting from a least significant bit is selected prior to a pair with a second value having a first non-zero bit at a position K−1, wherein K is less than a count of bits a binary number representing the second value.

10. The system of claim 1, wherein the processing unit is configured to modify the first values or the second values of unselected pairs of the plurality pairs.

11. The system of claim 10, wherein the modifying of the first values or the second values includes setting the first values to zero or setting the second values to zero.

12. The system of claim 1, wherein selecting a pair from the plurality of pairs is based on an enable bit associated with the selected pair, and wherein the selector is configured to:
    determine that the enable bit is set for the pair; and
    in response to the determination, select the pair.

13. The system of claim 1, wherein selecting a pair from the plurality of pairs includes setting an index equal to a position of the pair in the plurality of pairs or in a subset of the plurality of pairs.

14. The system of claim 1, wherein the determining that the result satisfies the criterion includes comparing the result to one or more thresholds.

15. The system of claim 1, wherein the determining that the result satisfies the criterion includes comparing numbers, wherein at least one of the compared numbers is determined based on one of: the result, a first value, or a second values of a pair of the plurality of pairs.

16. The system of claim 1, wherein the plurality of pairs includes pairs with input values for the neuron and weights corresponding to the input values.

17. The system of claim 1, wherein the receiving the plurality of pairs includes:
    receiving a first plurality of the first values and a second plurality of the second values, wherein a first value of the first plurality is associated with a second value of the second plurality.

18. A method for accelerating neuron computations in an artificial neural network (ANN), the method comprising:
    receiving, by a processing unit implemented as a first electronic circuitry, a plurality of pairs, the pairs including first values and second values, the plurality of pairs associated with calculation of an output of a neuron of an ANN during inference of the ANN;
    selecting, by a selector implemented as a second electronic circuitry, a predetermined number of pairs from the plurality of pairs, wherein a count of the selected pairs is less than a count of all pairs in the plurality of pairs and at least one unselected pair includes a nonzero first value and a nonzero second value;
    determining, by an arithmetic unit implemented as a third electronic circuitry, products of the selected pairs;
    accumulating, by an accumulator implemented as a fourth electronic circuitry, the products to obtain a result;
    determining, by a control unit, implemented as a fifth electronic circuitry, that the result does not satisfy a criterion; and
    upon determining that the result does not satisfy the criterion, performing, by control unit, further operations comprising:
    causing the selector to select the predetermined number of further pairs from the plurality of pairs associated with the calculation of same neuron of the ANN during same inference of the ANN; and
    causing the arithmetic unit to determine further products of the selected further pairs; and causing the accumulator to accumulate the further products with the result to obtain a further result, wherein the further result is used for determination of the output of the neuron;
    wherein an order of the selected pairs and the selected further pairs being processed by the arithmetic unit is different from an order of pairs in the received plurality of pairs.

* * * * *